US007054833B1

(12) United States Patent
McDonald

(10) Patent No.: US 7,054,833 B1
(45) Date of Patent: May 30, 2006

(54) METHOD AND SYSTEM FOR PROCESSING UNCLAIMED PROPERTY INFORMATION

(76) Inventor: Patrick D. McDonald, 250 Highland Ave., Elmhurst, IL (US) 60126-2555

( * ) Notice: Subject to any disclaimer, the term of this patent is extended or adjusted under 35 U.S.C. 154(b) by 572 days.

(21) Appl. No.: 09/698,905

(22) Filed: Oct. 27, 2000

(51) Int. Cl.
G06Q 30/00 (2006.01)

(52) U.S. Cl. ...................................... 705/26
(58) Field of Classification Search ................. 705/26, 705/27
See application file for complete search history.

(56) References Cited

U.S. PATENT DOCUMENTS

| 5,502,576 | A | | 3/1996 | Ramsay et al. ............. 358/444 |
| 5,677,953 | A | | 10/1997 | Dolphin ........................ 380/4 |
| 5,703,951 | A | | 12/1997 | Dolphin ....................... 380/25 |
| 6,035,307 | A | * | 3/2000 | Martin et al. ................ 707/203 |
| 6,081,805 | A | * | 6/2000 | Guha ............................ 707/5 |
| 6,151,608 | A | * | 11/2000 | Abrams ........................ 707/204 |
| 6,185,576 | B1 | | 2/2001 | McIntosh ..................... 707/200 |
| 6,192,347 | B1 | | 2/2001 | Graff ........................... 705/36 |
| 6,266,442 | B1 | * | 7/2001 | Laumeyer et al. .......... 382/190 |
| 6,269,343 | B1 | * | 7/2001 | Pallakoff ..................... 705/26 |
| 6,370,547 | B1 | * | 4/2002 | Eftink ......................... 707/201 |
| 2002/0156780 | A1 | * | 10/2002 | Hertz et al. .................... 707/6 |

FOREIGN PATENT DOCUMENTS

WO     WO 9918818 A2 * 4/1999

OTHER PUBLICATIONS

"User's Guide: Borland Paradox for Windows, Version 5.0;" Borland International, Inc.; 1994.*
Greene, Joe; "Oracle DBA Survival Guide;" Sams Publishing; 1995.*
"World Wide Web's Largest and Original Database of Unclaimed Accounts Now Updated to Include Unclaimed Property Files from Holocaust Victims", Business Wire, New York, May 14, 1998, p. 1.*
"Scout Introduces Web Site Prototype to Locate Unclaimed Properties", PR Newswire, Aug. 31, 1998.*
www.foundmoney.com [online]<retrieved via the Internet at www.archive.org> [archived May 2, 1999][printed Dec. 11, 2005] (web site).*

(Continued)

*Primary Examiner*—Jeffrey A. Smith
(74) *Attorney, Agent, or Firm*—Lesavich High-Tech Law GROUP, P.C.; Stephen Lesavich

(57) ABSTRACT

A method and system for processing unclaimed property information. Escheat or unclaimed property information is periodically obtained from one or more unclaimed property repositories. The unclaimed property information maintained in multiple formats at the one or more unclaimed property repositories is transformed into a unified database format. Multiple database records are created in an unclaimed property database using the unified database format. Owners of unclaimed property, identified in the unclaimed property database are automatically located by searching one or more other databases on public and private computer networks such as the Internet. A located owner of unclaimed property is automatically notified as to the existence and amount of unclaimed property with electronic mail, an automatic voice recording or via paper documents. A graphical user interface available on a computer network is presented that allows an identified owner of unclaimed property to request unclaimed property. The graphical user interface is used to automatically request that unclaimed property from the one or more unclaimed property repositories for the identified owner be disbursed to the identified owner of unclaimed property.

26 Claims, 5 Drawing Sheets

OTHER PUBLICATIONS

"The FREEDOM Group Announces a Powerful New Version of Its Market Leading TRACKER Unclaimed Property System", Business Wire, New York, Dec. 30, 1999, p. 1.*

"User's Guide: Borland Paradox for Windows, Version 5.0;" Borland International, Inc.; 1994.*

Greene, Joe; "Oracle DBA Survival Guide;" Sams Publishing; 1995.*

* cited by examiner

METHOD AND SYSTEM FOR PROCESSING UNCLAIMED PROPERTY INFORMATION

FIELD OF INVENTION

This invention relates to processing unclaimed property. More specifically, it relates to a method and system for obtaining, identifying and refunding unclaimed property to its rightful owners.

BACKGROUND OF THE INVENTION

"Escheat property", by definition is any property that is subject to reversion to the state if no one rightfully claims it. The practice of escheat or unclaimed property (hereinafter "unclaimed property") originated in feudal England where land reverted to the crown if no heirs could be identified. The practice continues today in every state in the United States under authority granted by various unclaimed property statutes. It has been estimated that there is over $400 billion dollars in unclaimed property in the United States. Some states are holding unclaimed property from as far back as the 1800's.

Most unclaimed property reverts to the state as a result of death of the owner, a change of name as a result of a marriage or divorce, a change of address, etc. Many times an owner of the unclaimed property may know of its existence, but then forget about it or not realize that it has reverted to the state.

Examples of unclaimed property include: cash or personal property; dormant bank accounts; uncashed cashiers checks and money orders; safety deposit box contents; savings bonds; insurance proceeds; corporate dividends; profit sharing distributions; tax returns; utility deposits; wills and trusts inheritances; military, railroad or union pension benefits; HUD/FHA housing refunds; court judgements; mineral royalty payments; real estate; and others. Owners of unclaimed properties include individuals as well as organizations. Examples of holders of unclaimed property required to surrender unclaimed property to the state include: financial institutions, insurance companies, stock brokers, retail, wholesale, service companies, court systems and others.

There are several problems associated with trying to identify owners of unclaimed property. One problem is that every year a state is required to publish the names of unclaimed property owners in a general circulation newspaper in order to notify the rightful owners. However, this publication generally occurs only once a year. If an owner of unclaimed property misses this publication, the owner may never know that he/she is entitled to make a claim to the unclaimed property for that year.

Another problem is that the states typically only publish a list of unclaimed property owners for unclaimed property obtained during a current year. An individual may check a state list of unclaimed property owners for a current year and assume that he/she has no unclaimed property. However, such an individual may be entitled to unclaimed property obtained by the state in previous years.

Another problem is that all states have limited resources in terms of both technology and manpower. Locating unclaimed property owners is a very low priority task in most states.

Another problem is that some states deposit the unclaimed property in an interest bearing account. The interest generated from unclaimed/unclaimed property deposits funds a myriad of state programs from public education to state worker pensions. Thus, many states will not actively try to locate unclaimed property owners because they rely heavily on the interest from such unclaimed property accounts.

Another problem is that many states refuse to grant general public access to unclaimed property lists. In such states, it is often necessary to file freedom of information requests or other petitions to force a state to grant access to unclaimed property lists.

Another problem is that unclaimed property places a large management burden on private financial institutions such as banks. These financial institutions spend considerable time and resources trying to manage unclaimed property that cannot be returned to its rightful owners.

There have been attempts to solve some of the problems associated with finding owners of unclaimed property. There are a number of individuals or companies who, for a fee, will locate owners and facilitate a refund from the state. Such finders on the Internet include "findcash.com" and "fundsrecovery.net" and others. Finders will generally obtain owners names manually from the published listings, libraries or state unclaimed property offices or from the Internet. Finders exist largely because the states' due diligence requirements are minimal.

However, such finders may also only check a current year's unclaimed property list. In addition, finders typically may only provide an individual with the name and address of the state unclaimed property office that has unclaimed property for a fee. The owner of the unclaimed property then has to contact the state's unclaimed property office, obtain the proper forms and request disbursement of the unclaimed property.

Some states also utilize the Internet to post a partial listing of their unclaimed property, and still other states participate in National Association of Unclaimed Property Administrators ("NAUPA") which acts as a clearinghouse of unclaimed property information. Depending on the source, it is estimated that new unclaimed property accumulates at a rate from hundreds of millions to a billion dollars every year.

Thus, it is desirable to provide a consistent automated method to locate and refund money to unclaimed property owners. The method should include the ability to search a current year's unclaimed property lists as well as previous years unclaimed property lists.

SUMMARY OF THE INVENTION

In accordance with preferred embodiments of the present invention, some of the problems associated with locating unclaimed property owners and refunding unclaimed property are overcome. A method and system for processing unclaimed property information is presented.

The present invention provides a method and system to acquire unclaimed property information, unify its format, automatically notify owners of unclaimed property information and automatically request disbursements of unclaimed property for owners of unclaimed property. The present invention may benefit individual owners of unclaimed property because refunds will occur that may not have taken place otherwise. The present invention may also benefit unclaimed property organizations such as state agencies because resources currently devoted to this endeavor could be re-evaluated and possibly re-allocated to other programs.

The foregoing and other features and advantages of a preferred embodiment of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Unclaimed Property System

Figure 1:
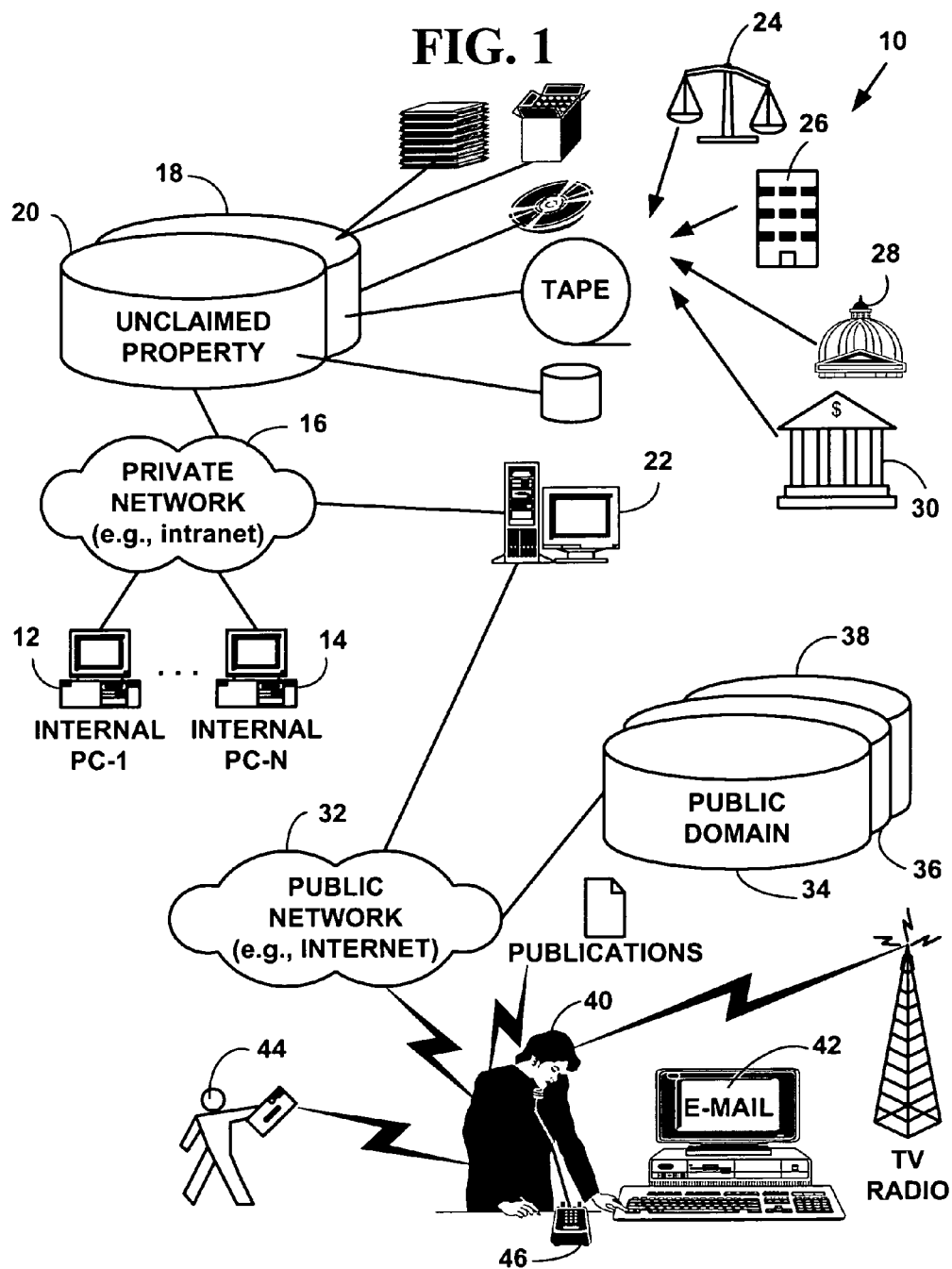
FIG. 1 is a block diagram illustrating a system for identifying owners of unclaimed property.

FIG. 1 is a block diagram illustrating an unclaimed property system 10 for one embodiment of the present invention. The unclaimed property system 10 includes one or more computers 12, 14, (only two of which are illustrated) for acquiring and analyzing unclaimed property information on a private local area network ("LAN") 16 (e.g., an intranet). The LAN 16 is connected to one or more unclaimed databases 18, 20 (only two of which are illustrated) used to store unclaimed property information. The unclaimed property databases 18,20 may be local to LAN 16 or remote to LAN 16.

The LAN 16 may be connected to a publicly accessible database server 22. The unclaimed property system 10 acquires data from one or more unclaimed property information repositories 24, 26, 28, 30 (only four of which are illustrated) including unclaimed property information. The unclaimed property information repositories include information in a variety of electronic formats including, CD-ROM, computer tape, other computer readable media and a variety of non-electronic forms including paper, microfiche, etc. The publicly accessible database server 22 is connected to a public network 32 (e.g., the Internet). The public network 32 is connected to plural public domain databases 34, 36, 38 (only three of which are illustrated) including information used to locate owners 40 of unclaimed property. An owner 40 of unclaimed property personally receives unclaimed property information via electronic mail ("e-mail") 42, paper documents 44, such as a conventional mail or express mail, or via an automated voice recording 46 as is described below. An owner of unclaimed property may have access to unclaimed property information via a website on the Internet, television, radio, publication in newspapers, magazines, or other media. However, more, fewer or other equivalent data store components can also be used and the present invention is not limited to the unclaimed property system 10 components illustrated in FIG. 1.

In one specific exemplary embodiment of the present invention, unclaimed property system 10 includes the following specific components. However, the present invention is not limited to these specific components and other similar or equivalent components may also be used. The one or more internal user computers, 12, 14 are conventional personal computers that include a display application that provides a Graphical User Interface ("GUI") application. The GUI application is used to lead user through acquisition and analysis of unclaimed property information and supports custom viewing capabilities. The GUI application also supports data exported into standard desktop tools such as databases, spreadsheets, graphics packages, and word processors.

In one embodiment of the present invention, the LAN 16 is a 100 Mega-bit ("Mbit") per second or faster Ethernet, LAN. However, other types of LANs could also be used (e.g., optical or coaxial cable networks). In addition, the present invention is not limited to these specific components and other similar components may also be used.

In one specific embodiment of the present invention, one or more protocols from the Internet Suite of protocols are used on the LAN 16, so LAN 16 comprises a private intranet. Such a private intranet can communicate with other public or private networks using protocols from the Internet Suite. As is known in the art, the Internet Suite of protocols includes such protocols as the Internet Protocol ("IP"), Transmission Control Protocol ("TCP"), User Datagram Protocol ("UDP"), Hypertext Transfer Protocol ("HTTP"), Hypertext Markup Language ("HTML"), extensible Markup Language ("XML") and others.

The one or more internal databases 18, 20 are multi-user, multi-view databases that store experimental data. The databases 18, 20 use relational database tools and structures. The data stored within the one or more proprietary databases 18, 20, that may or may not be available to the public. Databases 18, 20, are made available to computers 12, 14 and other external computers through the database server 22 using selected security features (e.g., login, password, firewall, etc.)

An operating environment for components of the unclaimed property system 10 for preferred embodiments of the present invention include a processing system with one or more high speed Central Processing Unit(s) ("CPU") or other processor(s) and a memory system. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed," or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or may be distributed among multiple interconnected cooperating processing systems that may be local or remote to the processing system.

Acquiring Unclaimed Property Information

Figure 2:
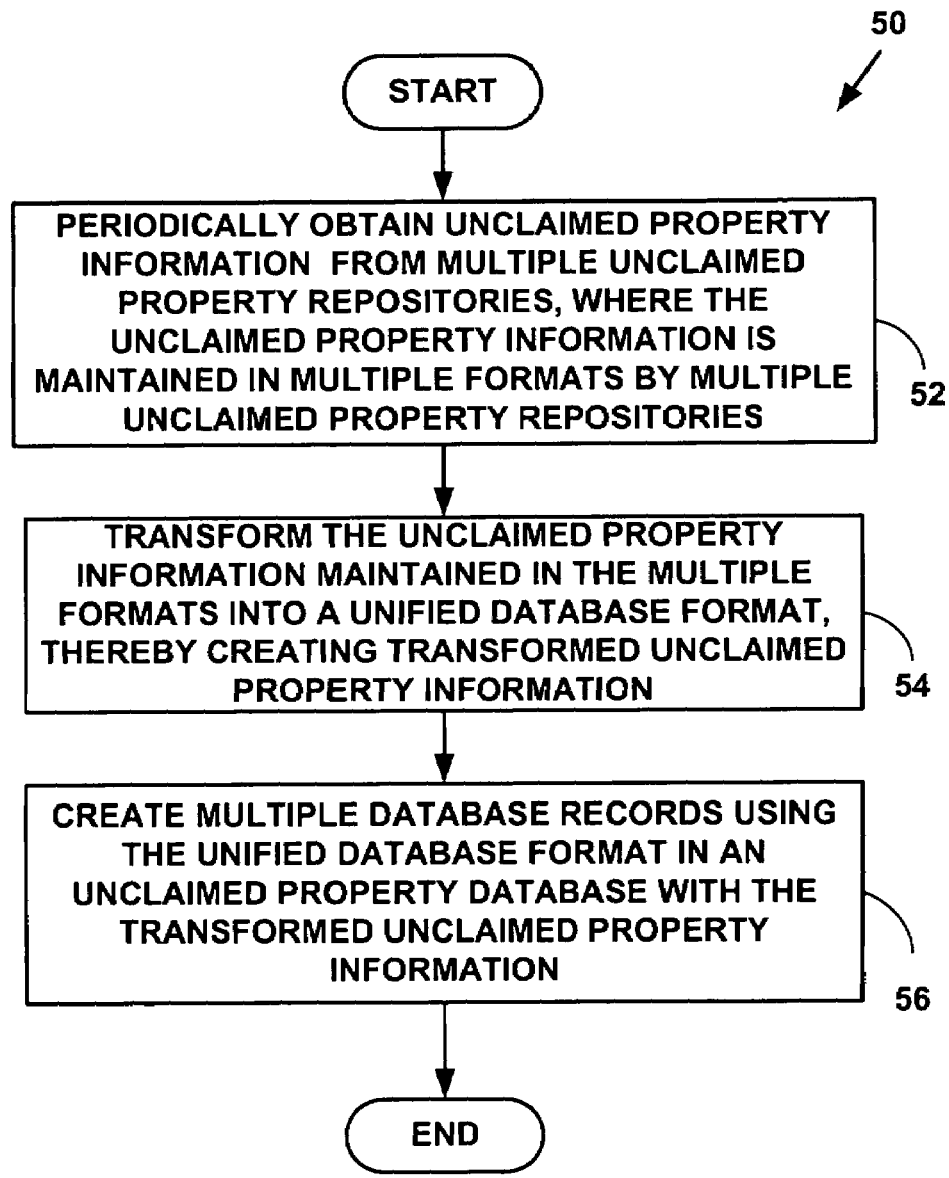
FIG. 2 is a flow diagram illustrating a method for acquiring unclaimed property information.

FIG. 2 is a flow diagram illustrating a Method 50 for acquiring unclaimed property information. At Step 52, unclaimed property information is periodically obtained from multiple unclaimed property repositories. The unclaimed property information is maintained in multiple formats by multiple unclaimed property repositories. At Step 54, the unclaimed property information maintained in the multiple formats is transformed into a unified database format, thereby creating transformed unclaimed property information. At Step 56, multiple database records are created in an unclaimed property database with the transformed unclaimed property information using the unified database format.

Method 50 is illustrated with one exemplary embodiment of the present invention. However, present invention is not limited to such an exemplary embodiment and other or equivalent embodiments can also be used with Method 50.

In such an embodiment in FIG. 2 at Step 52, unclaimed property information is periodically obtained from multiple unclaimed property repositories 24, 26, 28, 30. The multiple unclaimed property repositories include federal government agencies, state and local government agencies, financial institutions, legal agencies, as well as a variety of other public and private agencies.

The unclaimed property information is initially collected for all years from a present year back in time to an earliest year that an unclaimed property repository has data. For example, some states have unclaimed property information from the 1800's to the present, while other states have only a few decades worth of information. Once unclaimed property information is initially collected for all years, only new unclaimed property information is collected periodically at Step 52 at a frequency that it is updated at unclaimed property repositories (e.g., once or twice a year).

The federal government agencies include financial institutions, such as banks, the Internal Revenue Service, and others. The state agencies include state unclaimed property offices, state and local courts, state pension funds, etc. In some instances, Step 52 may require litigation under state and federal freedom of information acts to obtain an initial release of unclaimed property information.

The unclaimed property information is maintained in multiple formats by the multiple unclaimed property repositories including: (1) CD-ROMS; (2) computer tapes; (3) other computer readable formats; and (4) a variety of paper or other types of documents including microfiche. Since the unclaimed property information is maintained in multiple formats, some types of information may require initial manual processing by data entry operators (e.g., paper and microfiche). Portions of this manual processing may also be automated by electronically scanning or otherwise processing unclaimed property information from paper and microfiche and storing it in desired electronic formats. Other types of information, are preferably automatically processed directly by computers 12,14 from the CD-ROMS, computer tapes, other computer readable media, etc. at Step 52.

In one embodiment of the present invention, unclaimed property information is obtained first from states in the United States with larger populations as is illustrated in Table 1. Table 1 also illustrates the format in which unclaimed property information is currently available from such states. However, the present invention is not limited to obtaining unclaimed property information first from states with large populations, and any of the unclaimed property information can be obtained in any order.

TABLE 1

| Pop Rank | State Abb | Media before October 1999 | Media after October 1999 |
|---|---|---|---|
| 1 | CA | c, m | c, m |
| 2 | NY | c | c |
| 3 | TX | c | c |
| 4 | FL | c | c |
| 5 | PA | p | c |
| 6 | IL | p | c |
| 7 | OH | c | c |
| 8 | MI | p | c |
| 9 | NJ | na | pending |
| 10 | NC | na | c |
| 11 | GA | c | c |
| 12 | VA | na | na |
| 13 | MA | m | m |
| 14 | IN | na | c |
| 15 | MO | p | c |
| ... | ... | ... | ... | c = computer readable media (e.g., CD-ROM, tape, etc.)
m = microfiche
p = paper
na = not currently available At Step 54, the unclaimed property information in the multiple formats is transformed into a unified database format. Since unclaimed property information is obtained from a variety of sources, it initially exists in a wide variety of formats. The variety of formats may include structured database formats as well as unstructured or "flat" data formats. For example, one source may only include a year the property was surrendered, a name, last known address, a type of unclaimed property (e.g., real property such as real estate, personal property, etc.), a dollar amount of unclaimed property and an unclaimed repository identifier.

Another unclaimed property repository may include this information as well as a social security number, unclaimed property identification number and martial status. Yet another source may include only a name, last know address and dollar amount of unclaimed property. Not all unclaimed property information will include all of the information obtained for another unclaimed property information source. A unified database format is used to allow automated processing and increase efficiency of searching and processing of unclaimed property information.

In one exemplary embodiment of the present invention, the unclaimed property information is collected and transformed into an exemplary unified database format as illustrated in Table 2. However, the present invention is not limited to such an exemplary database format, and other database formats with more, fewer or equivalent fields can also be used.

TABLE 2

-UPRID- -NAME- -LAST KNOW ADDRESS- -TYPE- -AMOUNT-
-PHONE NUMBER- -ORIGINAL RESPOSITORY ID-
-E-MAIL ADDRESS- -ORIGINAL DB SOURCE-
-DB LINKS- -OTHER INFORMATION-

As is illustrated in Table 2, the unified database format includes, for example, database fields for an unclaimed property identifier (UPRID) assigned to a database record, a name of an unclaimed property owner, a last known address, a type of unclaimed property such as personal property (i.e., money other personal items) or real property (i.e., real estate), a dollar amount of unclaimed property, a phone number, an e-mail address, an indication of the source of the unclaimed property information (e.g., a state unclaimed property database), database links to other database records in the unclaimed property database or to database records in an original source of unclaimed property information, if such information is available in a computer readable format available to computers 12, 14, and other relevant information (e.g., notification and/or fee information).

In one embodiment of the present invention, Step 54 also includes deleting duplicate information and applying additional formatting steps to further process the unclaimed property information (e.g., changing all names to include only lower case letters to make searching easier, etc.).

In one embodiment of the present invention, Step 54 also includes combining two or more pieces of information from two or more separate fields from the multiple unclaimed property repositories to create one field in the unified database format used for transformed unclaimed property information. For example, a name (Smith) and a social security number (391-12-3456) could be combined into an identifier field as "Smith391123456." Such an identifier is then used in the unified database format.

At Step 56, multiple database records are created with transformed unclaimed property information using the unified database format in an unclaimed property database. A database record may be linked to multiple other records if an unclaimed property owner has multiple types or amounts of unclaimed property (e.g., real property, personal property, etc.).

In one embodiment of the present invention, Step 56 also includes collecting and grouping database records with similar names. In a majority of unclaimed property repositories, there are database records with typing and other mistakes. If a typing mistake is made in a name, it is difficult to later search for the name with typing mistakes. Thus, similar names are linked or otherwise cross-referenced. The similar names are linked or cross-referenced to allow later searching of the unclaimed property data, even if the similar names may include typing mistakes. For example, the similar names, smith, snith, smitk, smyth, Smith, Smyth, Smithe, Smythe and Smeth may linked or cross referenced.

In one embodiment of the present invention, database records are created at Step 56 using input forms with pre-determined fields. Data is input into the input forms either manually by a human user or automatically with an automated process using computer software. In another embodiment of the present invention, database records are created without input forms automatically with an automated process using computer software.

The unified database format illustrated in Table 2 is a unified format used to create multiple relational database records of unclaimed property information that can be quickly queried, searched and/or otherwise processed since the unclaimed property information typically results in a huge amount of information. For example, the unclaimed property information may result in a storage requirement of hundreds of gigabytes to hundreds or thousands of terabytes of information As is known in the art, a gigabyte is $2^{30}$ bytes, and is commonly interpreted as "one billion bytes." As is known in the art, one terabyte equals $2^{40}$ bytes, and is commonly interpreted as "one trillion bytes."

The unclaimed property database is preferably multiple cooperating or linked databases 18, 20 that may be distributed over one or more computer networks 16 and communicate with one another. Such multiple databases 18, 20 may be controlled by the database controller 22.

In one embodiment of the present invention, the unclaimed property database is a collection of relational data databases 18, 20 using proprietary formats since commercially available databases such as those sold by Oracle Corporation of Santa Clara, Calif., Microsoft Corporation of Redmond, Wash., and others can not store, query or process such large amounts of information. In another embodiment of the present invention, the unclaimed property database uses commercially available databases such as those sold by Oracle, Microsoft, and others.

In one preferred embodiment of the present invention, the unclaimed property database is a pass-through database or includes pass-through fields in database records. As is known in the art, a "pass-through database" includes links to other databases, but typically does not contain any actual database data, or just a small amount of actual database data. In one such an embodiment, the unclaimed property database records may include actual data only in selected fields (e.g., the UPRID field) and include pass-through links for the remaining unified database format fields illustrated in Table 2 to one or more other sources of electronic unclaimed property information. The sources of unclaimed property information can be other cooperating unclaimed property databases 18, 20 or original sources of unclaimed property information from unclaimed property repositories.

Based on the information obtained at Step 52, the unclaimed property database 18,20 is periodically updated to reflect the most currently available unclaimed property information. For example, a current address, name change, e-mail address or other updated information may be periodically updated in the unclaimed property database if updated information is available. The unclaimed property databases 18, 20 are used to automatically notify owners of unclaimed property information.

Notifying Owners of Unclaimed Property

Figure 3:
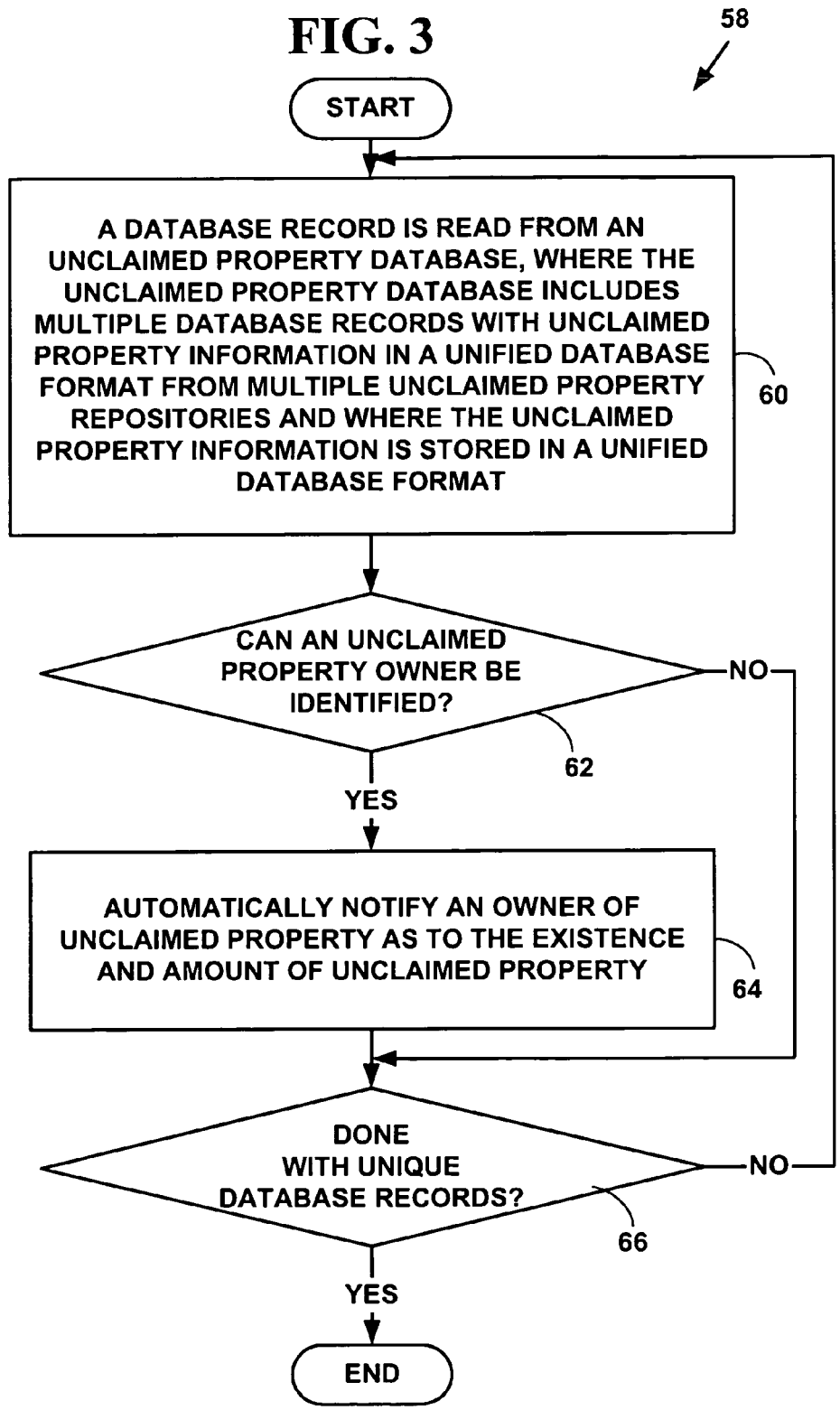
FIG. 3 is a flow diagram illustrating a method for notifying owners of unclaimed property.

FIG. 3 is a flow diagram illustrating a Method 58 for notifying owners of unclaimed property. At Step 60, a database record is read from an unclaimed property database. The unclaimed property database includes multiple database records with unclaimed property information from multiple unclaimed property repositories. The unclaimed property information is stored in a unified database format in the unclaimed property database. At Step 62, a test is conducted to determine whether an owner of unclaimed property identified in the database record can be located by automatically located by searching one or more other databases on public and private computer networks. If an owner of unclaimed property can be identified, at Step 64 an owner of unclaimed property is automatically notified as to the existence and amount of unclaimed property. At Step 66, a loop is entered to repeat Step 60 and 62 for unique records in the unclaimed property database.

Method 58 is illustrated with one exemplary embodiment of the present invention. However, present invention is not limited to such an exemplary embodiment and other or equivalent embodiments can also be used with Method 58.

At Step 60, an unclaimed property database record with the unified database format illustrated in Table 2 is read from the unclaimed property database 18, 20. In one embodiment of the present invention, the database record includes all information for an unclaimed property owner in a single record. In another embodiment of the present invention, the database record may be linked to multiple other records if an unclaimed property owner has multiple types or amounts of unclaimed property. In another embodiment of the present invention, Step 60 includes reading cross-referenced or linked database records that may include similar or misspelled names.

At Step 62, a test is conducted to determine whether an owner of unclaimed property can be located by automatically searching one or more other databases 34, 36, 38 on public 32 and private 16 computer networks. An unclaimed property owner can be an individual or an organization, such as a corporation, bank, etc. Preferably, the one or more other databases 34, 36, 38 are automatically searched by computer software programs. However, in another less preferred embodiment of the present invention, one or more of the other databases can be manually searched by human searchers.

In one exemplary preferred embodiment of the present invention, the one or more other databases 34, 36, 38 include electronic telephone number and address databases, e-mail databases, domain name databases, Internet search engines information or databases such as those provided by Yahoo, Lycos, and others, and other public record databases on the Internet. Other private fee-based databases such as Lexis, Westlaw and proprietary databases may also be searched via the Internet 32, intranet 16, or other computer networks. The private fee-based databases may also include databases with historical information such as credit databases, tax databases, real-estate databases, or other databases with historical information. Multiple databases are searched and the results correlated at Step 62. As the databases are searched, any information obtained is cross-referenced to try and locate an unclaimed property owner 40.

For example, a search can be conducted for an individual unclaimed property owner at Step 62. State of Illinois unclaimed property information may indicate Jane Q. T. Smith's last know address was 1234 Main Street in Chicago, Ill. A search of telephone directory databases for Illinois revealed no current matches for Jane Q. T. Smith. However, a nationwide search of telephone directories revealed an entry for Jane Q. T. Smith at 5678 Harbor Street in Seattle, Wash. There is a high-probability, because of the unique middle initials "Q. T.," that this is the Jane Smith with unclaimed property in Illinois. Another search of an e-mail database, revealed an entry for the e-mail address iqtsmith@aol.com. Similar cross-references are also used for name changes, etc. from a number of other public and private databases. Many different types of searching, pattern matching and cross-referencing techniques known in the art are applied at step 62 to locate unclaimed property owners.

As another example, organization unclaimed property owners can be searched for at Step 62. The Internet is searched at Step 62 to determine the identity of a bank's largest holding companies. A bank holding company is selected. Next, other Internet searches are conducted to learn the current organizational information for the selected bank holding company. It may be determined that the bank holding company has numerous wholly owned subsidiaries, doing business in many states, under different names. The Internet search information may be downloaded to computers 12, 14 that can sort the bank subsidiary information alphabetically, by state or using other types of sorting. The computers 12, 14 are used to conduct searches for the bank holding company name in the unclaimed property database 18, 20. The computers 12, 14 automatically generate a report that may be sent to a Chief Financial Officer ("CFO") or other individual in charge of recovering unclaimed property for the bank holding company at Step 64.

These types of automated searches conducted at Step 62 can be applied to virtually any unclaimed property owner. Private individuals, public and private organizations and the like can be targeted in a single state or all states.

If an owner of unclaimed property can be located, at Step 64 an owner 40 of unclaimed property is notified automatically as to the existence of unclaimed property.

In one exemplary embodiment of the present invention, an owner of unclaimed property is notified automatically via electronic mail ("e-mail") 42 (FIG. 1), paper documents 44 (e.g., U.S. mail, express mail, etc.), an automated voice message 46, or other ways (e.g., in person, etc.) depending on the information available for an unclaimed property owner 40. The e-mail 42, paper documents 44 (or automated voice messages) are automatically generated and sent to the unclaimed property owner 40 by internal unclaimed property computers 12,14. The notification of unclaimed property includes, for example, a unique unclaimed property identifier, an explanation of the type and amount of unclaimed property, an unclaimed property identifier and information explaining how the owner can obtain the unclaimed property. In addition, an owner of unclaimed property can be notified via a web-site, television, radio, publication in newspapers, magazines, etc. In one embodiment of the present invention, the television, radio, or print publications are automatically generated.

In one embodiment of the present invention, the unclaimed property identifier (e.g., UPCID, Table 2) is used to automatically collect and present electronic forms used to request necessary information for unclaimed property repositories for which an identified unclaimed property owner has unclaimed property. Use of the unique unclaimed property identifier is further explained below.

At Step 66, a loop is entered to repeat Steps 60 and 62 for unique records in the unclaimed property database 18, 20. Method 58 is repeated every time new unclaimed property information is obtained from an unclaimed property repository and processed with Method 50.

In one embodiment of the present invention, database records in the unclaimed property database are sorted by type and monetary value of property. A cut-off amount may be used (e.g., $1000.00), and only unclaimed property owner's whose unclaimed property amount exceeds the cut-off amount are automatically notified at Step 64. In another embodiment of the present invention, all owners of unclaimed property with any amount of unclaimed property that can be located are notified at Step 64.

Requesting Disbursements of Unclaimed Property

Figure 4:
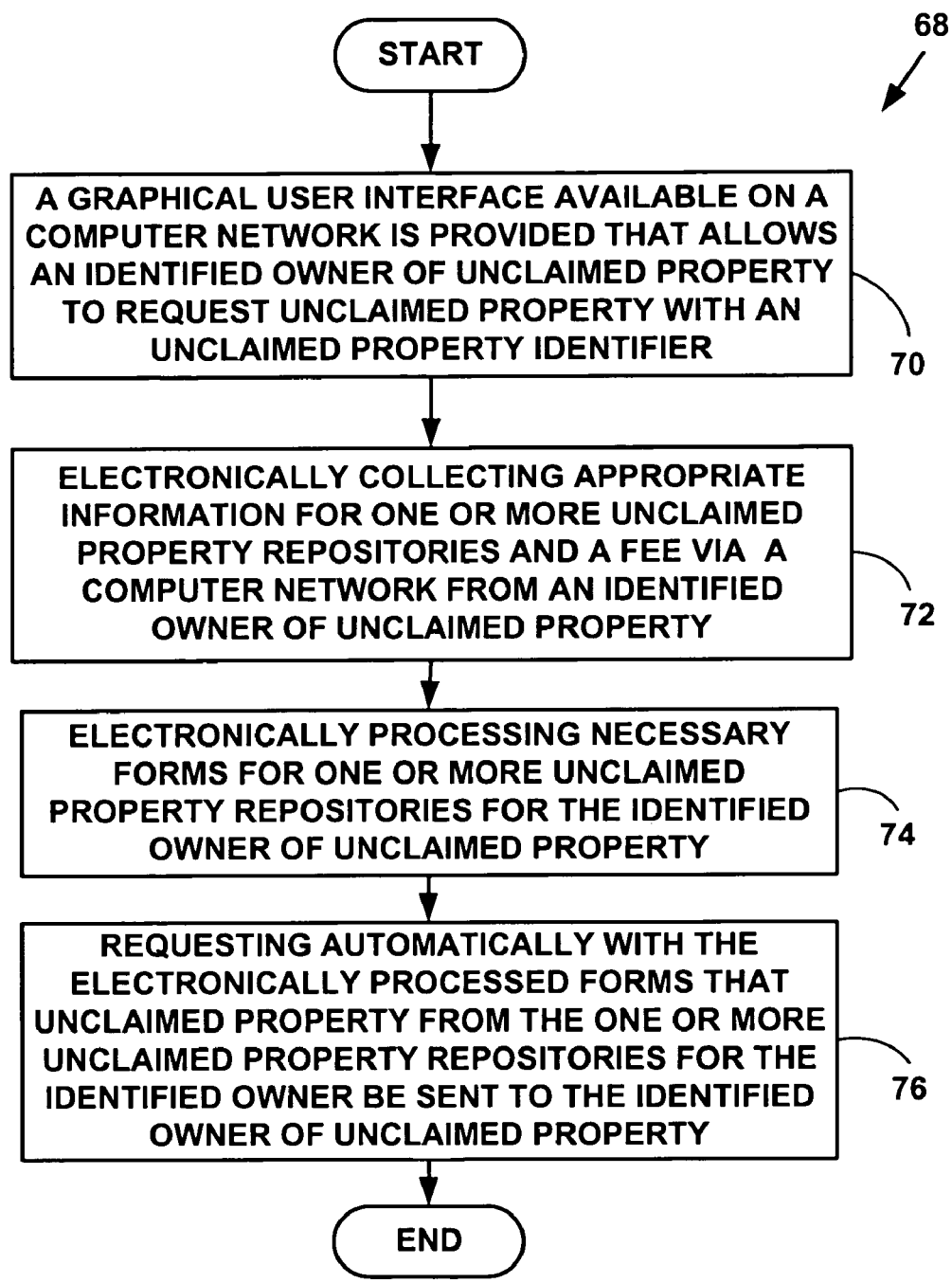
FIG. 4 is a flow diagram illustrating a method for automatically requesting disbursements of unclaimed property.

FIG. 4 is a flow diagram illustrating a Method 68 for automatically requesting disbursements of unclaimed property. At Step 70, a graphical user interface is provided via a public computer network that allows an owner of unclaimed property to request unclaimed property. At Step 72, appropriate information for one or more unclaimed property repositories and a fee is electronically collected via a computer network from an identified owner of unclaimed property using the collected information. At Step 74, necessary forms are processed for one or more unclaimed property repositories for the identified owner of unclaimed property. At Step 76, the electronically processed forms are used to automatically request that unclaimed property from the one or more unclaimed property repositories for the identified owner be disbursed to the identified owner of unclaimed property.

Method 68 is illustrated with one exemplary embodiment of the present invention. However, present invention is not limited to such an exemplary embodiment and other or equivalent embodiments can also be used with Method 68.

At Step 70, a graphical user interface is provided via a public computer network 32 such as the Internet that allows an owner of unclaimed property to request unclaimed property. In one embodiment of the present invention, the graphical user interface includes an electronic document written in a markup language such as Hyper Text Markup Language ("HTML"), eXtensible Markup Language ("XML"), and others that is presented as a page of information on the World-Wide-Web via the Internet 32. However, programming languages other than markup languages can also be used (e.g., C/C++, Java, etc.) for the graphical user interface.

At Step 72, appropriate information for one or more unclaimed property repositories and a fee is electronically collected from an identified owner of unclaimed property. The appropriate information includes that information required on forms used by the one or more unclaimed property repositories to recover unclaimed property. The appropriate information and the fee are collected via an input form (e.g., HTML, XML) or the type of input form presented to an owner of unclaimed property via a public computer network such as the Internet 32.

In one exemplary embodiment of the present invention, the unclaimed property identifier (e.g., UPCID, Table 2) is used to dynamically display input forms to obtain necessary information from only those unclaimed property repositories for which an owner of unclaimed property has unclaimed property. For example, if unclaimed property owner-A has unclaimed property from repositories 1 and 7, the input forms will include information only for repositories 1 and 7. If unclaimed property owner-B has unclaimed property from repositories 2 and 6, the input forms will include information only for repositories 2 and 6. In another less preferred embodiment of the present invention, the appropriate information and fee information is collected using a live unclaimed property operator and processed electronically via an automated processing system.

In one embodiment of the present invention, the fee is electronically collected automatically for a credit card, debit card, or deducted from a checking or savings account. In another embodiment of the present invention, the fee is a flat fee per unclaimed property transaction (e.g., $19.95). In another embodiment of the present invention, the fee is a contingent on the value of the unclaimed property (e.g., 1% to 10%). In another embodiment of the present invention, an owner of unclaimed property is not charged for receiving unclaimed property. In such an embodiment, an owner of the unclaimed property system 10, receives fees from an unclaimed property repository owner (e.g., a state agency) for providing the unclaimed property services.

At Step 74, necessary forms are electronically processed for one or more unclaimed property repositories for the identified owner of unclaimed property. The information obtained at Step 70 is used to complete necessary forms to request unclaimed property for an unclaimed property owner.

At Step 76, the electronically processed forms are used to automatically request that unclaimed property from the one or more unclaimed property repositories for the identified owner be disbursed to the identified owner of unclaimed property. The requests are made electronically for any unclaimed property repositories that accepts electronic requests. For unclaimed property repositories that do not accept electronic requests for unclaimed property, paper copies of the necessary forms are automatically mailed or otherwise delivered to the one or more unclaimed property repositories.

In the case of personal property such as money, the unclaimed property is delivered directly to an unclaimed property user by the one or more unclaimed property repositories (e.g., with a check). In the case of real property, such as real-estate, the unclaimed property owner may have to make additional arrangements for transfer of a title, deed, etc.

Figure 5:
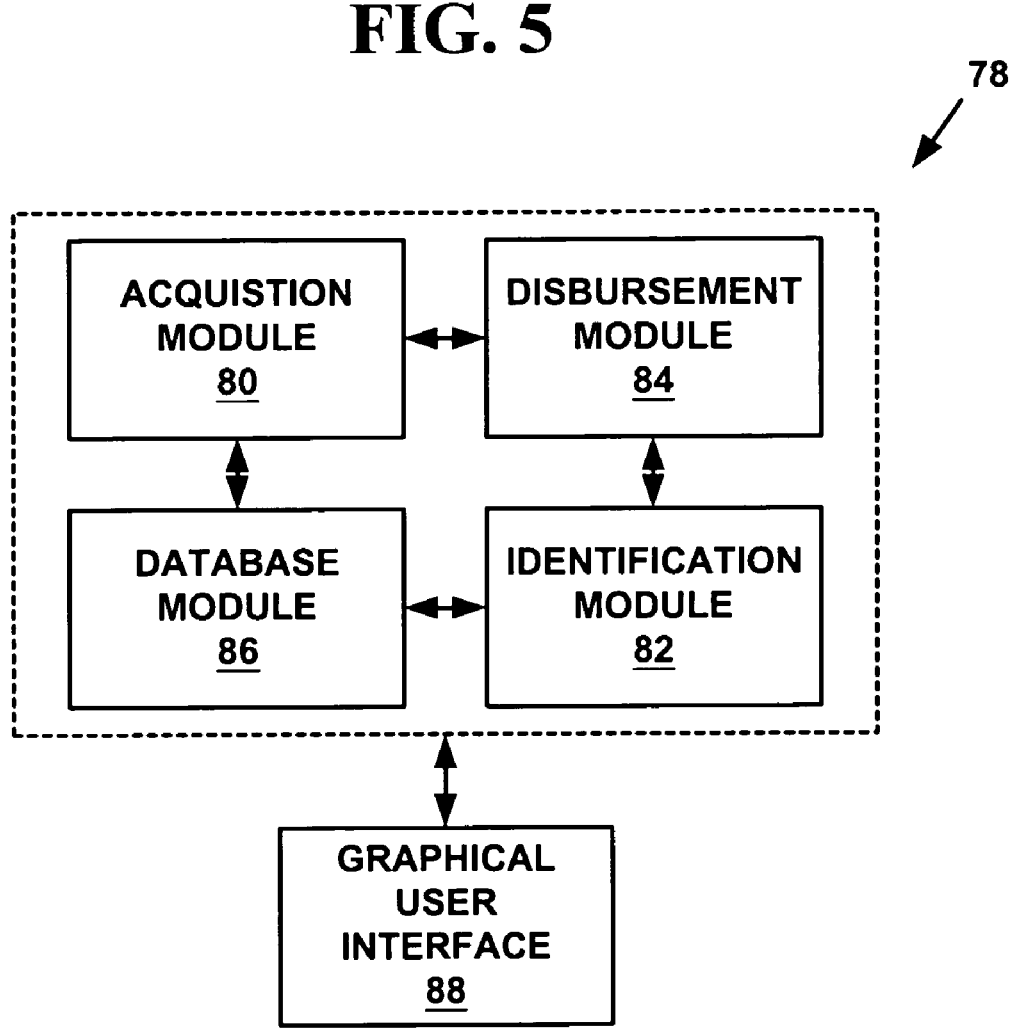
FIG. 5 is a block diagram illustrating an unclaimed property software system.

FIG. 5 is a block diagram illustrating an unclaimed property network system 78. The unclaimed property network system 78 includes an unclaimed property acquisition module 80, an unclaimed property identification module 82, an unclaimed property disbursement module 84, an unclaimed property data store 86 and a graphical user interface 88. However, the present invention is not limited to these components and more, fewer or equivalent components can also be used. In one embodiment of the present invention, the unclaimed property network system 78 is implemented in software i=(e.g., C/C++, Java, etc). While various elements of unclaimed property network system 78 have been described as being implemented in software, in other embodiments hardware or firmware implementations may alternatively be used, and vice-versa.

The unclaimed property acquisition module 80 periodically obtains unclaimed property information from unclaimed property repositories 24, 26, 28, 30. The unclaimed property information is maintained in multiple formats by unclaimed property repositories. The unclaimed property acquisition module 80 transforms the unclaimed property information maintained in the multiple formats into a unified database format, thereby creating transformed unclaimed property information. It also creates database records in an unclaimed property database 18, 20 with transformed unclaimed property information using the unified database format.

The unclaimed property identification module 82 reads a database record from an unclaimed property database 18, 20, determines whether an owner 40 of unclaimed property identified in the database record can be automatically located by searching one or more other databases 34, 36, 38 on public and private computer networks 16, 32. If so, notifying automatically 42, 44, 46 an owner 40 of unclaimed property as to the existence and amount of unclaimed property.

The unclaimed property disbursement module 84 electronically collects appropriate information required by one or more unclaimed property repositories 24, 26, 28, 30 to disburse unclaimed property and a fee via a graphical user interface from an identified owner 40 of unclaimed property. It electronically processes any necessary forms for the one or more unclaimed property repositories for the identified owner of unclaimed property using the collected information. The unclaimed property disbursement module 84 also automatically requests with the electronically processed forms that unclaimed property from the one or more unclaimed property repositories for the identified owner 40 be disbursed to the identified owner 40 of unclaimed property;

The unclaimed property database module 86 stores unclaimed property information in unclaimed property database 18, 20, wherein the unclaimed property database 18, 20 includes database records created from unclaimed property information from multiple unclaimed property repositories 24, 26, 28, 30. The unclaimed property information is stored in a unified database format in the unclaimed property data store 86.

The graphical user interface 88 available on a computer network 16, 32 that allows an identified owner 40 of unclaimed property to request unclaimed property via the unclaimed property disbursement module 84.

The present invention provides a method and system to acquire unclaimed property information, unify its format, automatically notify owners of unclaimed property information and automatically request disbursements of unclaimed property for owners of unclaimed property. The present invention may benefit individual or organizational owners of unclaimed property because refunds will be obtained that may never have been received. The present invention may also benefit unclaimed property organizations run state agencies because resources currently devoted to this endeavor can be re-evaluated and possibly re-allocated.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. A method for acquiring unclaimed property information, comprising:
   automatically obtaining periodically a plurality of unclaimed property information from a plurality of unclaimed property repositories, wherein the plurality of unclaimed property information is maintained in a plurality of different formats by the plurality of unclaimed property repositories;
   automatically transforming the plurality of unclaimed property information maintained in the plurality of different formats into a unified database, thereby creating transformed unclaimed property information; and
   automatically creating a plurality of database records in an unclaimed property database with the transformed unclaimed property information using the unified database format.

2. The method of claim 1 wherein the step of automatically obtaining periodically a plurality of unclaimed property information from a plurality of unclaimed property repositories includes obtaining unclaimed property information from state government agencies, federal government agencies, state court agencies, federal court agencies, public financial institutions or private financial institutions.

3. The method of claim 1 wherein the step of automatically transforming the plurality of unclaimed property information maintained in the plurality of formats into a unified database format includes automatically processing unclaimed property information from paper documents, microfiche, CD-ROMs, or computer tapes.

4. The method of claim 1 wherein the step of automatically transforming the plurality of unclaimed property information maintained in the plurality of different formats into a unified database format includes extracting selected information from the plurality of different formats and storing the selected information in a designated information field in the unified database format.

5. The method of claim 1 wherein the step of automatically transforming the plurality of unclaimed property information in the plurality of different formats into a unified database format includes deleting duplicate or incomplete entries from the plurality of unclaimed property in formation.

6. The method of claim 1 wherein the step of automatically transforming the plurality of unclaimed property information in the plurality of different formats into a unified database format includes combining two or more information fields from the plurality of unclaimed property information into one information field in the unified database format.

7. The method of claim 1 wherein the stop of automatically creating a plurality of database records using the unified database format in an unclaimed property database with transformed unclaimed property information includes automatically creating a plurality of pass-through database records.

8. The method of claim 1 wherein the unclaimed property database is a pass-through database.

9. The method of claim 1 wherein the step of automatically creating a plurality of database records using the unified database format includes automatically electronically linking selected ones of the plurality of database records in the unclaimed property database to original unclaimed property information from the plurality of unclaimed property repositories.

10. The method of claim 1 wherein the step of automatically creating a plurality of database records using the unified database format includes:
    automatically creating a database record; and
    automatically linking the database record with other database records that include similar names.

11. The method of claim 10 wherein the database record from the unclaimed property database is linked to a plurality of other database records if an unclaimed property owner has multiple types or amounts of unclaimed property.

12. A computer readable medium having stored therein instructions for causing a processor to execute the method of claim 1.

13. A method of locating owners of unclaimed property, comprising:
    (a) reading a database record from an unclaimed property database, wherein the unclaimed property database includes a plurality of database records automatically created from a plurality of unclaimed property information from a plurality of unclaimed property repositories, and wherein the unclaimed property information is stored in a unified database format in the unclaimed property database;
    (b) determining whether an owner of unclaimed property identified in the database record can be automatically located by searching one or more other databases on public and private computer networks; and if so,
    (c) notifying automatically an owner of unclaimed property as to the existence and amount of unclaimed property; and
    (d) repeating steps (a) and (b) for unique records in the unclaimed property database.

14. The method of claim 13 wherein step (c) includes notifying an owner of unclaimed property with electronic mail, an automatically generated voice message or paper documents.

15. The method of claim 13 wherein step (c) includes notifying an owner of unclaimed property via a web-site, television, radio or via a publication in a newspaper or magazine.

16. The method of claim 13 wherein the step (c) includes notifying an owner of unclaimed property with a unique, unclaimed property identifier that can be used by the owner of unclaimed property to electronically request the unclaimed property electronically via a computer network.

17. The method of claim 13 wherein step (a) includes automatically searching other database records with similar information linked to the database record.

18. A computer readable medium having stored therein instructions for causing a processor to execute the method of claim 13.

19. A method for automatically requesting disbursement of unclaimed property, comprising:
providing a graphical user interface available on a computer network that allows an identified owner of unclaimed property to request unclaimed property;
electronically collecting appropriate information required by one or more unclaimed property repositories to disburse unclaimed property and a fee via the graphical user interface from an identified owner of unclaimed property;
electronically processing necessary forms for the one or more unclaimed property repositories for the identified owner of unclaimed property using the collected information;
requesting automatically with the electronically processed forms that unclaimed property from the one or more unclaimed property repositories for the identified owner be disbursed to the identified owner of unclaimed property.

20. The method of claim 19 wherein the step of electronically collecting appropriate information for one or more unclaimed property repositories and a fee via a computer network from an identified owner of unclaimed property includes only specific information required by the one or more unclaimed property repositories to recover unclaimed property.

21. The method of claim 19 wherein the step of electronically collecting appropriate information for one or more unclaimed property repositories and a fee via a computer network from an identified owner of unclaimed property includes collecting appropriate information for one Or more unclaimed property repositories via an input form written in the Hyper Text Markup Language or extensible Markup Language or the type of input) form and presented to an owner of unclaimed property via the Internet.

22. The method of claim 19 wherein the fee is electronically collected automatically for a credit card, debit card, or electronically deducted from a checking or savings account.

23. The method of claim 19 wherein the step of electronically collecting appropriate information includes automatically collecting and displaying input forms to collect appropriate information based on an unclaimed property identifier supplied to an owner of unclaimed property when the owner of unclaimed property was notified to existence of unclaimed property.

24. A computer readable medium having stored therein instructions for causing a processor to execute the method of claim 19.

25. An unclaimed property network system, comprising in combination:
an unclaimed property acquisition module for automatically obtaining periodically a plurality of unclaimed property information from a plurality of unclaimed property repositories, wherein the plurality of unclaimed property information is maintained in a plurality of different formats by the plurality of unclaimed property repositories, automatically transforming the plurality of unclaimed property information maintained in the plurality of formats into a unified database format, thereby creating transformed unclaimed property information, and automatically creating a plurality of database records in an unclaimed property database with transformed unclaimed property information using the unified database format;
an unclaimed property identification module for reading a database record from an unclaimed property database, determining whether an owner of unclaimed property identified in the database record can be automatically located by searching one or more other databases on public and private computer networks, and if so, notifying automatically an owner of unclaimed property as to the existence and amount of unclaimed property;
an unclaimed property disbursement module for electronically collecting appropriate information required by one or more unclaimed property repositories to disburse unclaimed property and a fee via a graphical user interface from an identified owner of unclaimed property, electronically processing necessary forms for the one or more unclaimed property repositories for the identified owner of unclaimed property using the collected information, and requesting automatically with the electronically processed forms that unclaimed property from the one or more unclaimed property repositories for the identified owner be disbursed to the identified owner of unclaimed property;
an unclaimed property database module for automatically storing a plurality of unclaimed property information in an unclaimed property database in a unified database format; and
a graphical user interface available on a computer network that allows an identified owner of unclaimed property to request unclaimed property via the unclaimed property disbursement module.

26. The system of claim 25 further comprising:
an unclaimed property database including a plurality of database records stored in a unified database format created from a plurality of unclaimed property information from a plurality of unclaimed property repositories.

* * * * *